(12) United States Patent
Fujinami

(10) Patent No.: US 7,185,356 B2
(45) Date of Patent: Feb. 27, 2007

(54) IMAGE PROCESSING APPARATUS AND IMAGE PROCESSING METHOD AS WELL AS RECORDING MEDIUM

(75) Inventor: Yasushi Fujinami, Kanagawa (JP)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 09/920,170

(22) Filed: Aug. 1, 2001

(65) Prior Publication Data

US 2002/0026458 A1    Feb. 28, 2002

(30) Foreign Application Priority Data

Aug. 2, 2000    (JP)    ............................. 2000-233924

(51) Int. Cl.
*H04N 7/173*    (2006.01)
*H04N 5/91*    (2006.01)

(52) U.S. Cl. ............................. 725/90; 725/88; 725/89; 386/68

(58) Field of Classification Search ............ 725/88–90; 386/68

See application file for complete search history.

(56) References Cited

U.S. PATENT DOCUMENTS 6,005,600 A * 12/1999 Hill ............................. 725/134
6,507,672 B1 * 1/2003 Watkins et al. ............. 382/232
6,845,398 B1 * 1/2005 Galensky et al. ........... 709/231

* cited by examiner

*Primary Examiner*—Chris Kelley
*Assistant Examiner*—Michael Van Handel
(74) *Attorney, Agent, or Firm*—Oblon, Spivak, McClelland, Maier & Neustadt, P.C.

(57) ABSTRACT

The invention provides an image processing apparatus and method by which a network can be used efficiently and playback and so forth with a favorable responsibility can be achieved. If a user operates an operation panel to input an instruction for normal playback, then a control circuit of a digital television monitor determines a frame to be played back at present as a noticed frame and requests the hard disk recorder for image data of successive 15 frames forwardly and backwardly adjacent the noticed frame and image data at positions of time intervals of 0.5 seconds within a range of 2 minutes forwardly and backwardly of the noticed frame through an IEEE 1394 cable. Then, when image data of the object of the request are received from the hard disk recorder, the control circuit stores the image data into a buffer which can store image data for several hours. The image data stored in the buffer are read out when necessary and displayed on a display unit.

16 Claims, 11 Drawing Sheets

IMAGE PROCESSING APPARATUS AND IMAGE PROCESSING METHOD AS WELL AS RECORDING MEDIUM

BACKGROUND OF THE INVENTION

This invention relates to an image processing apparatus and an image processing method as well as a recording medium, and more particularly to an image processing apparatus and an image processing method as well as a recording medium which can be suitably applied to a network which complies with the standard of the IEEE (Institute of Electrical and Electronics Engineers) 1394 or the like.

Communication in accordance with the IEEE 1394 standard which is one of standards for a digital interface allows isochronous transfer of data and therefore is suitable for transfer of data which need be played back on the real time basis such as image and sound data. Further, also from an increase in demand for communication of multimedia data in recent years, much attention is paid to the communication in accordance with the IEEE 1394 standard.

FIG. 1 shows a configuration of an example of an AV (Audio Visual) system (the term "system" is used herein to signify a plurality of apparatus gathered logically irrespective of whether or not the apparatus are accommodated in the same housing) which allows communication in accordance with the IEEE 1394 standard.

The AV system of FIG. 1 includes a hard disk recorder 31 and a digital television monitor 32 of the DV (Digital Video) system which are IEEE 1394 apparatus as apparatus which comply with the IEEE 1394 standard, and an IEEE 1394 cable 3. The hard disk recorder 31 and the digital television monitor 32 are connected to each other by the IEEE 1394 cable 3.

It is to be noted that, in the following description, in order to avoid complicated description, description is given only of image data from between image data and sound data. Further, it is assumed basically that an image played back by the hard disk recorder 31 is transmitted through the IEEE 1394 cable 3 to the digital television monitor 32 by which it is outputted (displayed).

The hard disk recorder 31 includes a hard disk 41, a signal processing circuit 42, an interface circuit 43, and a control circuit 44.

The signal processing circuit 42 performs necessary signal processing for image data supplied thereto from the interface circuit 43 and supplies the processed image data to the hard disk 41 so as to be recorded onto the hard disk 41. Further, the signal processing circuit 42 plays back (reads out) image data recorded on the hard disk 41, performs necessary signal processing for the image data and supplies the processed image data to the interface circuit 43.

The interface circuit 43 functions as an interface for allowing communication compliant with the IEEE 1394 standard to be performed. In particular, the interface circuit 43 converts the format of image data and other data supplied thereto from the signal processing circuit 42 into that of data compliant with the IEEE 1394 standard, and transmits the resulting data to the IEEE 1394 cable 3. Further, the interface circuit 43 receives image data and other data from the IEEE 1394 cable 3, converts the format of the received data back into its original format and supplies the data of the original format to the signal processing circuit 42.

The control circuit 44 controls the signal processing circuit 42 and the interface circuit 43, for example, in response to a request and so forth from the digital television monitor 32 received by the interface circuit 43.

The digital television monitor 32 includes an interface circuit 51, a signal processing circuit 52, a display unit 53, a control circuit 54 and an operation panel 55.

The interface circuit 51 functions as an interface for allowing communication compliant with the IEEE 1394 standard to be performed similarly to the interface circuit 43, and transmits image data and so forth supplied thereto from the signal processing circuit 52 to the IEEE 1394 cable 3. Further, the interface circuit 51 receives image data and other data from the IEEE 1394 cable 3 and supplies them to the signal processing circuit 52.

The signal processing circuit 52 performs necessary signal processing for image data supplied thereto from the interface circuit 51 and supplies the processed image data to the display unit 53. Further, the signal processing circuit 52 supplies various requests and so forth from the control circuit 54 to the interface circuit 51 so as to be transmitted through the IEEE 1394 cable 3.

The display unit 53 is formed from, for example, a CRT (Cathode Ray Tube) or a liquid crystal panel and displays image data from the signal processing circuit 52.

The control circuit 54 controls the interface circuit 51 and the signal processing circuit 52 in accordance with an operation signal or the like from the operation panel 55.

The operation panel 55 includes buttons and so forth to be operated in order to input various instructions such as playback of image data, pause or fast feeding, and supplies an operation signal corresponding to an operated button to the control circuit 54. It is to be noted that the operation panel 55 may otherwise be a panel provided integrally on the digital television monitor 32 or a remote commander for remotely controlling the digital television monitor 32.

Now, operation of the AV system of FIG. 1 is described.

In the AV system of FIG. 1, if the power supply to the hard disk recorder 31 and the digital television monitor 32 is placed into an on state, then the interface circuit 43 of the hard disk recorder 31 and the interface circuit 51 of the digital television monitor 32 recognize IEEE 1394 apparatus connected thereto by the IEEE 1394 cable 3 (in FIG. 1, the hard disk recorder 31 and the digital television monitor 32) and establish a logical channel (data channel) for use for delivery of data and another logical channel (control channel) for use for delivery of a control signal. Then, between the hard disk recorder 31 and the digital television monitor 32, data and a control signal are delivered through the channels.

First, for example, in order to cause the hard disk recorder 31 to record image data, the user will connect an image inputting apparatus (not shown) which can input an image such as a video camera to the interface circuit 43 using the IEEE 1394 cable 3, and operate the image inputting apparatus to input image data to the hard disk recorder 31. The image data are received by the interface circuit 43 and supplied to the signal processing circuit 42.

The signal processing circuit 42 performs necessary signal processing for the image data from the interface circuit 43 such as, for example, coding into image data of the DV system and supplies the resulting image data to the hard disk 41 so as to be recorded onto the hard disk 41.

It is to be noted that recording of an image by the hard disk recorder 31 may otherwise be performed, for example, in the following manner. In particular, if the digital television monitor 32 has an input terminal provided thereon, then image data can be inputted to the digital television monitor 32 through the input terminal. Thus, the image data are coded into image data of the DV system by the signal processing circuit 52, and the image data of the DV system are supplied from the interface circuit 51 through the IEEE 1394 cable 3 to the hard disk recorder 31 so as to be recorded by the hard disk recorder 31.

On the other hand, in order to play back image data recorded by the hard disk recorder 31 and transmit the image data to the digital television monitor 32 so that the image data are displayed, the user will operate the button (playback button) of the operation panel 55 for inputting a playback (normal playback) instruction. In this instance, the operation panel 55 supplies an operation signal for a normal playback instruction to the control circuit 54. The control circuit 54 receives the operation signal for a normal playback instruction and sets the operation mode of the apparatus to a normal playback mode. After the normal playback mode is entered, the interface circuit 51, signal processing circuit 52 and display unit 53 are placed into an input waiting state for image data.

Further, the control circuit 54 controls the interface circuit 51 to transmit a mode signal representing that the normal playback mode is entered to the hard disk recorder 31 through the control channel of the IEEE 1394 cable 3.

The mode signal is received by the interface circuit 43 of the hard disk recorder 31. When the mode signal is received, the interface circuit 43 supplies the mode signal to the control circuit 44. The control circuit 44 changes the operation mode of the apparatus in accordance with the mode signal from the interface circuit 43. In the present case, the normal playback mode is established as the operation mode.

After the normal operation mode is entered, the signal processing circuit 42 starts playback of image data from the hard disk 41. It is to be noted that, if the user operates the operation panel 55 to designate image data (contents) to be played back, then the signal processing circuit 42 starts playback of the image data designated by the user beginning with the top of the image data. On the other hand, for example, if the user does not particularly designate image data to be played back, then the signal processing circuit 42 starts playback from a position of the hard disk 41 determined in advance (for example, from a position at which the last playback ended). Here, if the user operates the operation panel 55 to designate contents to be played back, then a signal representative of the designated contents is transmitted from the digital television monitor 32 to the hard disk recorder 31 through the control channel of the IEEE 1394 cable 3.

The signal processing circuit 42 decodes the image data played back from the hard disk 41 and outputs the decoded image data from an output terminal not shown. In particular, since image data of the DV system are recorded on the hard disk 41, when the image data are to be outputted from the output terminal, the signal processing circuit 42 decodes the image data of the DV system into image data of, for example, the NTSC system and then outputs the image data of the NTSC system from the output terminal.

Further, the signal processing circuit 42 supplies the image data of the DV system played back from the hard disk 41 to the interface circuit 43. The interface circuit 43 transmits the image data of the DV system from the signal processing circuit 42 to the digital television monitor 32 through the data channel of the IEEE 1394 cable 3.

Accordingly, here, image data compression coded in accordance with the DV system are transmitted from the hard disk recorder 31 to the digital television monitor 32 through the IEEE 1394 cable 3. It is to be noted that, although it is possible to transmit image data of the NTSC system or the like obtained by decoding image data of the DV system from the hard disk recorder 31 to the digital television monitor 32, between different IEEE 1394 apparatus, image data of the DV system are usually communicated as they are.

The image data transmitted from the hard disk recorder 31 through the IEEE 1394 cable 3 in such a manner as described above are received by the interface circuit 51 of the digital television monitor 32. The interface circuit 51 supplies the image data to the signal processing circuit 52. The signal processing circuit 52 decodes the image data of the DV system from the interface circuit 51 into image data of, for example, the NTSC system and supplies the resulting image data to the display unit 53 so that the image data are displayed on the display unit 53.

Then, if the user operates, for example, the button (fast feed button) of the operation panel 55 for inputting an instruction for fast feeding, then the operation panel 55 supplies an operation signal for a fast feed instruction to the control circuit 54. In this instance, the control circuit 54 controls the interface circuit 51 to transmit a mode signal for instruction to set a fast feed mode to the hard disk recorder 31 through the IEEE 1394 cable 3.

The mode signal for instruction to establish the fast feed mode is received by the interface circuit 43 of the hard disk recorder 31 and supplied to the control circuit 44. The control circuit 44 receives the mode signal and sets the operation mode of the apparatus to the fast feed mode.

After the fast feed mode is entered, the signal processing circuit 42 plays back the image data for each N frames from the hard disk 41.

While image data compression coded in accordance with the DV system are recorded on the hard disk 41, since the data amount per one frame in the DV system is fixed and the data of the DV system include only intra-coded images without involving interframe coding, it is possible to play back image data of the DV system for each plurality of frames. It is to be noted that it is otherwise possible to record image data compression coded in accordance with a system which involves interframe coding such as, for example, the MPEG system on the hard disk 41. In this instance, for detection of a recorded position of image data of a predetermined frame, a method disclosed in Japanese Patent Laid-Open No. Hei 6-325553(1994) or No. Hei 11-312381 (1999) filed for patent in Japan by the assignee of the present application can be adopted.

If the signal processing circuit 42 plays back image data after each N-1 frames from the hard disk 41, then N-fold speed playback is performed.

The signal processing circuit 42 supplies the image data played back from the hard disk 41 to the interface circuit 43. The image data are thereafter transmitted to the digital television monitor 32 in a similar manner to that in the normal playback mode.

The digital television monitor 32 controls the display unit 53 to display the image data from the hard disk recorder 31 in a similar manner to that in the normal playback described hereinabove. In this instance, since the image data transmitted thereto from the hard disk recorder 31 are data of frames at intervals of N frames, moving pictures in a fast fed state are displayed on the display unit 53.

Then, if the user operates, for example, the button (pause button) of the operation panel 55 for inputting a pause instruction, then the operation panel 55 supplies an operation signal for a pause instruction to the control circuit 54. In this instance, the control circuit 54 controls the interface circuit 51 to transmit a mode signal for instruction of the pause mode to the hard disk recorder 31 through the IEEE 1394 cable 3.

The mode signal for instruction of the pause mode is received by the interface circuit 43 of the hard disk recorder 31 and supplied to the control circuit 44. The control circuit 44 receives the mode signal and sets the operation mode of the apparatus to the pause mode.

After the pause mode is entered, the signal processing circuit 42 supplies image data of the same frame obtained by repetitively playing back a frame of the image data, which has been played back last from the hard disk 41, from the hard disk 41 to the interface circuit 43. The interface circuit 43 transmits the image data from the signal processing circuit 42 to the digital television monitor 32 through the IEEE 1394 cable 3. It is to be noted that the hard disk recorder 31 may additionally include a frame buffer between the hard disk 41 and the signal processing circuit 42 such that image data of the same frame are read out not from the hard disk 41 but from the frame buffer.

The digital television monitor 32 controls the display unit 53 to display the image data from the hard disk recorder 31 in a similar manner as in the normal playback. In this instance, the image data transmitted from the hard disk recorder 31 are data of the same frame as described above, and therefore, moving pictures of a pause state (that is, an image in a still state) are displayed on the display unit 53.

Thereafter, if the user operates, for example, the playback button of the operation panel 55 for canceling the pause and designating playback (normal playback), then the operation panel 55 supplies an operation signal for a normal playback instruction to the control circuit 54. In this instance, the control circuit 54 controls the interface circuit 51 to transmit a mode signal for instruction of the normal playback mode to the hard disk recorder 31 through the IEEE 1394 cable 3.

The mode signal is received by the interface circuit 43 of the hard disk recorder 31 and supplied to the control circuit 44. In this instance, the control circuit 44 sets the operation mode of the apparatus to the normal playback mode.

After the normal playback mode is entered, the signal processing circuit starts playback of the image data beginning with a frame next to the frame which has been played back repetitively in the pause mode. The image data thus played back are transmitted to the digital television monitor 32 and displayed on the display unit 53 in a similar manner as described above.

Accordingly, moving pictures next to the image of a still state are displayed by the digital television monitor 32.

As described above, in the AV system described above, even if a pause instruction is issued, image data of the same frame are transmitted repetitively through the IEEE 1394 cable 3. In other words, also when a pause mode is established, image data are transmitted occupying a transmission bandwidth similar to that in normal playback. More particularly, where the image data to be transmitted are data, for example, of the NTSC system, they are transmitted occupying a transmission bandwidth corresponding to 29.97 frames/sec.

Accordingly, although there is no particular problem if the communication of the IEEE 1394 standard is used only for transmission of the image data, if it is used also for delivery of data by another application, a limited transmission bandwidth is used by transmission of image data of the same frame and the delivery of data by another application is limited. Thus, the transmission bandwidth is not utilized efficiently.

Further, in the AV system described above, after the user operates the operation panel 55, image data to be displayed are transmitted without fail from the hard disk recorder 31 to the digital television monitor 32. Therefore, the responsibility after the user operates the operation panel 55 until an image is displayed is sometimes low.

SUMMARY OF THE INVENTION

It is an object of the present invention to provide an image processing apparatus and an image processing method as well as a recording medium by which a network can be used efficiently and playback and so forth with a favorable responsibility can be achieved.

In order to attain the object described above, according to an aspect of the present invention, there is provided an image processing apparatus, comprising a reception section for receiving image data transmitted thereto from a transmission apparatus through a predetermined transmission line, a storage section having a storage capacity for a plurality of screens or more for storing the image data received by the reception section, and a control section for issuing a request for image data of screens within a predetermined range with reference to a noticed screen to the transmission apparatus and controlling a display apparatus to display the image data stored in the storage section.

According to another aspect of the present invention, there is provided an image processing method, comprising a reception step of receiving image data transmitted thereto from a transmission apparatus through a predetermined transmission line, a request step of requesting the transmission apparatus for image data of screens within a predetermined range with reference to a noticed screen, an image storage step of storing the image data of the screens within the predetermined range received by the reception step, and a display control step of controlling a display apparatus to display the stored image data.

According to a further aspect of the present invention, there is provided a recording medium on which a program to be executed by a computer is recorded, the program comprising a reception step of receiving image data transmitted thereto from a transmission apparatus through a predetermined transmission line, a request step of requesting the transmission apparatus for image data of screens within a predetermined range with reference to a noticed screen, an image storage step of storing the image data of the screens within the predetermined range received by the reception step, and a display control step of controlling a display apparatus to display the image data stored in the storage section.

With the image processing apparatus and the image processing method as well as the recording medium, a request for image data of screens within a predetermined range with reference to a noticed screen is issued to the transmission apparatus, and the image data of the screens within the predetermined range transmitted from the transmission apparatus through the predetermined transmission line are stored into the storage section. Then, the image data stored in the storage section are displayed on the display apparatus. Consequently, the transmission line can be used efficiently, and playback and so forth with a high responsibility can be achieved.

According to a still further aspect of the present invention, there is provided an image processing apparatus, comprising a transmission apparatus for playing back image data and transmitting the image data through a predetermined transmission line, and a reception apparatus for receiving the image data transmitted thereto from the transmission apparatus through the transmission line, the transmission apparatus including a playback section for playing back image data in response to a request from the reception apparatus and a transmission section for transmitting the played back image data to the reception apparatus through the predetermined transmission line, the reception apparatus including a reception section for receiving the image data transmitted thereto from the transmission apparatus through the predetermined transmission line, a storage section having a storage capacity for a plurality of screens or more for storing the image data received by the reception section, and a display control section for issuing a request for image data of screens within a predetermined range with reference to a noticed screen to the transmission apparatus and controlling a display apparatus to display the image data stored in the storage section.

With the image processing apparatus, the transmission apparatus plays back image data in response to a request from the reception apparatus and transmits the image data to the reception apparatus through the predetermined transmission line. The reception apparatus receives the image data transmitted thereto from the transmission apparatus through the transmission line and issues a request for image data of screens within a predetermined range with reference to a noticed screen to the transmission apparatus. Then, the image data of the screens within the predetermined range are stored into the storage section. Then, the image data stored in the storage section are displayed on the display apparatus. Consequently, the transmission line can be used efficiently, and playback and so forth with a high responsibility can be achieved.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Figure 1:
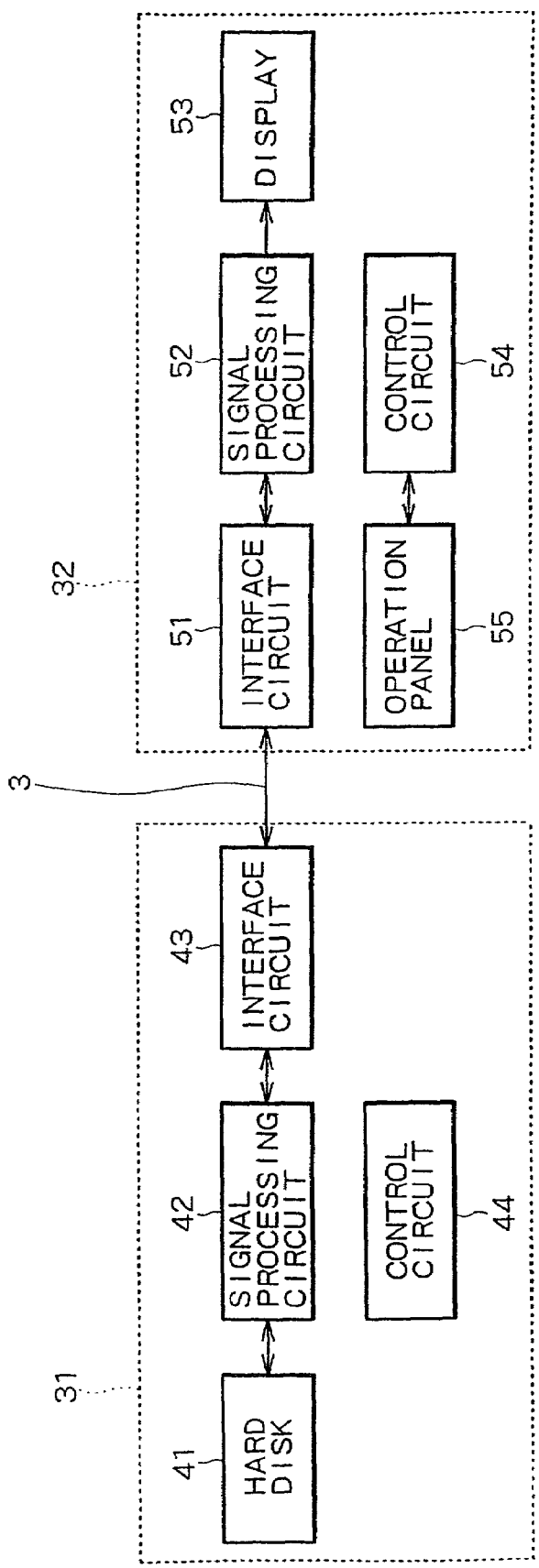
FIG. 1 is a block diagram showing a configuration of an example of common AV system.
Figure 2:
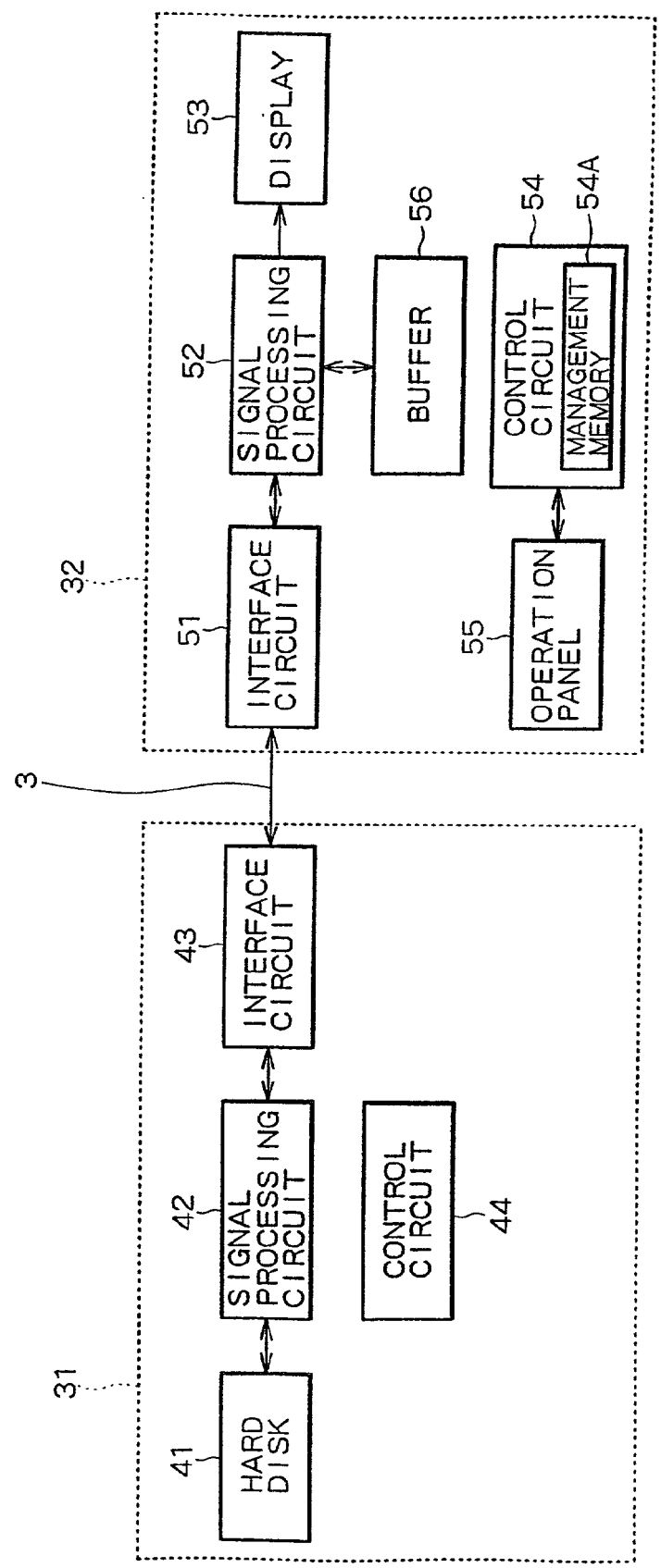
FIG. 2 is a block diagram showing an example of configuration of an AV system to which the present invention is applied.

FIG. 2 shows an example of configuration of an AV system to which the present invention is applied. It is to be noted that, in FIG. 2, like elements to those of FIG. 1 are denoted by like reference numerals and overlapping description of them is omitted herein suitably to avoid redundancy. In particular, the AV system of FIG. 2 has a basically similar configuration to that of the AV system of FIG. 1 except that the digital television monitor 32 additionally includes a buffer 56 and the control circuit 54 has a built-in management memory 54A.

The buffer 56 is formed from, for example, a semiconductor memory or a hard disk and has a storage capacity sufficient to storage image data for several hours. The buffer 56 temporarily stores image data received by the interface circuit 51 and supplied thereto through the signal processing circuit 52 under the control of the control circuit 54. It is to be noted that also image data and so forth to be transmitted from the digital television monitor 32 to an external apparatus through the IEEE 1394 cable 3 can be stored into the buffer 56 when necessary.

The management memory 54A stores management information of whether or not image data of each frame are stored in the buffer 56 under the control of the control circuit 54.

In the AV system of FIG. 2, image data are delivered between the interface circuit 43 of the hard disk recorder 31 and the interface circuit 51 of the digital television monitor 32 at such a transmission rate higher than the lowest transmission rate (hereinafter referred to suitably as normal transmission rate) necessary to play back image data normally as, for example, a transmission rate equal to twice the normal transmission rate through the IEEE 1394 cable 3.

Here, for example, according to the DVD (Digital Versatile Disc) standard, the lower limit value to the readout rate of data from a DVD is 11.08 Mbps (Mega Bit Per Second), and the highest transfer rate of data of a VOB (Video Object) of the DVD Video is 10.08 Mbps. Accordingly, the lower limit to the readout rate of data from a DVD is equal to approximately 1.1 times the highest transfer rate of data of a VOB file. Thus, the transmission rate between the interface circuits 43 and 51 may be equal to such 1.1 time with respect to the normal transmission rate.

Since transmission of image data through the IEEE 1394 cable 3 is performed at a transmission rate higher than the normal transmission rate as described above, not only image data sufficient to allow normal playback to be performed without interruption but also other image data, which may be surplus data to normal playback, can be transmitted from the hard disk recorder 31 to the digital television monitor 32.

Now, a manner of storage of image data into the buffer 56 and a management method of the image data are described.

Where image data transmitted from the hard disk recorder 31 to the digital television monitor 32 are, for example, of such a type that the data amount per one frame is fixed such as data compressed in accordance with the DV system as described hereinabove, the image data can be stored in a displaying order of frames into the buffer 56.

Figure 3:
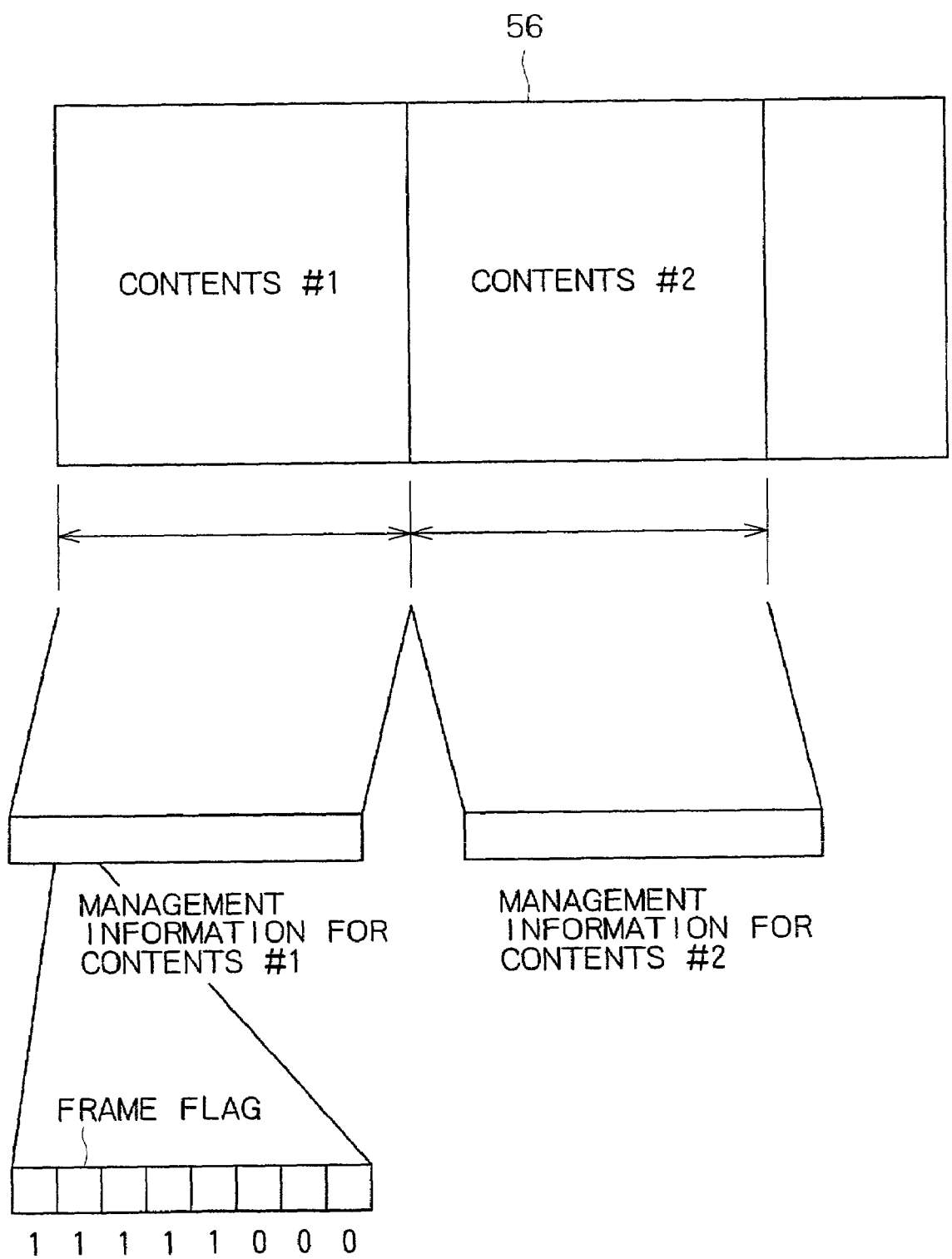
FIGS. 3 and 4 are diagrammatic views illustrating different manners of storage of image data in a buffer of the AV system of FIG. 2 and a management method of the image data.

In this instance, the control circuit 54 stores management information, which may be, for example, such a frame flag of 1 bit as illustrated in FIG. 3, into the management memory 54A to manage whether or not image data of each frame are stored in the buffer 56.

In particular, in the buffer 56 illustrated in FIG. 3, storage areas for storing two image contents #1 and #2 are assured by the control circuit 54. In this instance, the control circuit 54 stores management information in the form of a frame flag corresponding to each frame for each of the image contents #1 and #2 into the management memory 54A. The frame flag as management information has an initial value of, for example, 0 from between 0 and 1, and if image data of a frame corresponding to a frame flag are stored into the buffer 56, then the control circuit 54 changes over the frame flag from 0 to 1. Accordingly, in this instance, if the frame flag as management information is referred to, then it can be recognized whether or not image data of a frame corresponding to the frame flag are stored in the buffer 56. In particular, whether or not image data of the ith frame from the top of image contents are stored in the buffer 56 can be recognized by referring to the ith frame flag from the top of the corresponding management information.

After the control circuit 54 assures a storage area for storing image contents, it stores the top address of the storage area in a coordinated relationship to management information of the image contents into the control circuit 54. Accordingly, the position of the buffer 56 into which image data of the ith frame from the top of certain image contents are to be stored, or the position of the buffer 56 in which the image data are stored, can be recognized from the top address of the storage area for storing image contents, the variable (frame number) i and the fixed data amount per one frame.

It is to be noted that, in the buffer 56 illustrated in FIG. 3, the frame flag is a flag of 1 bit which assumes one of the values of 0 and 1. Accordingly, if the frame rate of image data is, for example, 30 frames/second, then management information, for example, for one hour for the image data amounts to 108,000 bits (=60 minutes×60 seconds×30 frames/second×1 bit).

Further, in the buffer 56 illustrated in FIG. 3, management information in the form of a frame flag of 1 bit is used to manage whether or not image data of each frame are stored in the buffer 56. However, it is otherwise possible to use such management information as, for example, illustrated in FIG. 4 to manage whether or not image data of each frame are stored in the buffer 56.

Figure 4:
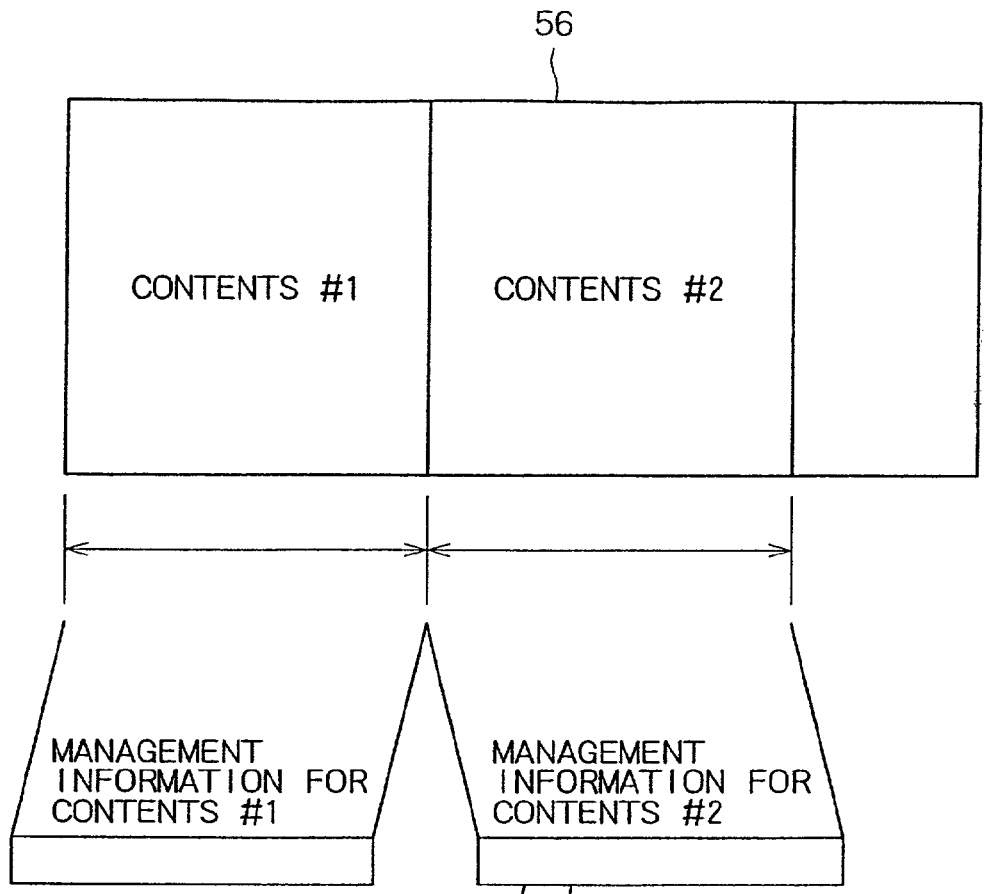

In particular, also in the buffer 56 illustrated in FIG. 4, storage areas for storing two image contents #1 and #2 are assured in the buffer 56 by the control circuit 54.

Further, in the buffer 56 illustrated in FIG. 4, management information has the form of an entry which is a set of a frame flag, the top address and a data length of each frame. A frame flag of the ith entry from the top of the management information is a flag of 1 bit similar to that in FIG. 3 and represents whether or not image data of the ith frame from the top of image contents managed with the management information are stored in the buffer 56. Meanwhile, the top address of the ith entry is formed from several bytes and represents the top address of the storage area of the buffer 56 in which the image data of the ith frame are stored. Further, the data length of the ith entry is formed from several bytes and represents the data length of the image data of the ith frame. Accordingly, in the buffer 56 illustrated in FIG. 4, it can be recognized by referring to the management information that, for example, image data of a frame of the image contents #2 whose frame number is tt:tt:03 are stored in a storage area of the buffer 56 having the length ddddd from the address xxxx6.

It is to be noted that, in the buffer 56 illustrated in FIG. 4, the top address and the data address of each entry are valid if the frame flag of the entry is 1. In particular, when image data of the ith frame are stored into the buffer 56, the control circuit 54 changes the ith frame flag of the management information from 0 to 1 and writes the start address and the magnitude of the storage area of the buffer 56 into which the image data have been stored into the top address and the data length of the management information, respectively.

In this manner, with the buffer 56 illustrated in FIG. 4, it is possible to refer to the management information to recognize whether or not image data of a certain frame are stored in the buffer 56 and, where the image data are stored in the buffer 56, recognize the top address and the data length of the storage area. Accordingly, with the buffer 56 illustrated in FIG. 4, even if the data amount of image data per one frame is not fixed, that is, even if the data amount of image data per one frame is variable like image data coded in accordance with, for example, the MPEG system, it can be managed whether or not image data of each frame are stored in the buffer 56, different from the buffer 56 illustrated in FIG. 3.

Further, while, with the buffer 56 illustrated in FIG. 3, it is necessary to store image data in the displaying order of frames into the buffer 56, with the buffer 56 illustrated in FIG. 4, image data need not be stored in the displaying order of frames but can be stored in any order in the buffer 56 because the storage area of the buffer 56 in which image data of each frame are stored can be recognized.

It is to be noted that image data stored in the buffer 56 and management information stored in the management memory 54A to be used for management of the image data are erased by the control circuit 54 when necessary such as, for example, when a predetermined time elapses or when the free area of the buffer 56 is short although it is necessary to store image data of new image contents. In this instance, fragmentation occurs with the buffer 56, and the control circuit 54 performs defragmentation for eliminating the fragmentation of the buffer 56 when necessary. Further, in order to store image data in order into the buffer 56, the free area of the buffer 56 must be managed, and also such management of the free area is performed by the control circuit 54.

The control circuit 54 of the digital television monitor 32 controls, if image data of a predetermined plurality of frames within a range of a predetermined time from a predetermined noticed frame are not stored in the buffer 56, the interface circuit 51 to request the hard disk recorder 31 for the image data not stored (such image data are hereinafter referred to suitably as non-stored image data).

Figure 5A:
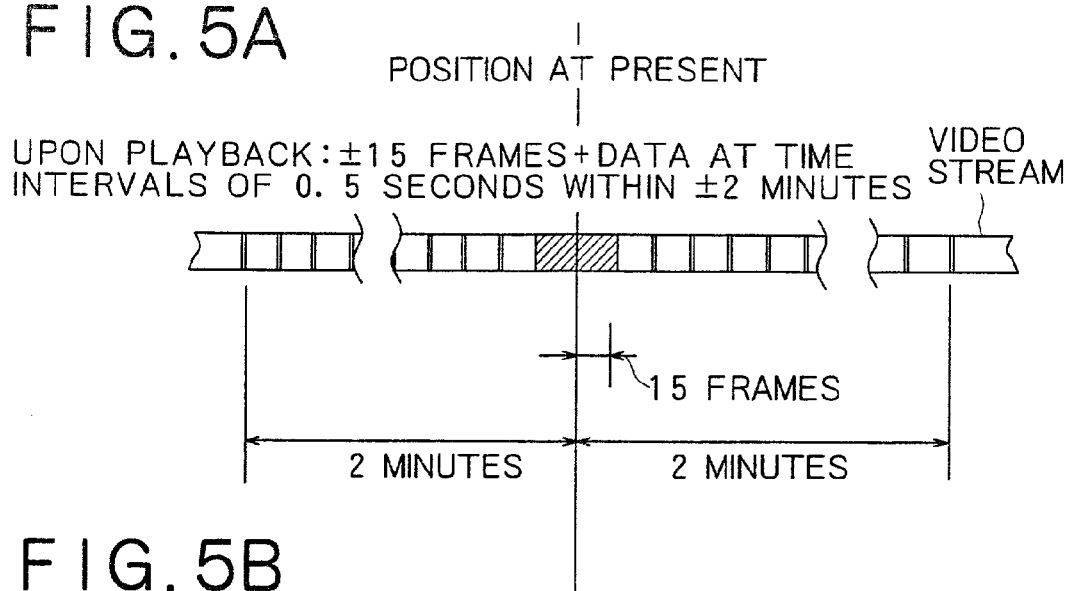
FIGS. 5A, 5B and 5C are diagrammatic views illustrating a scope of video data used in the AV system of FIG. 2.

In particular, the control circuit 54 determines a frame to be played back at present as a noticed frame and requests the hard disk recorder 31 for image data of frames around the noticed frame, for example, at a position indicated by slanting lines in FIG. 5A.

Here, if it is assumed that the position of the frames of image data for which the control circuit 54 requests the hard disk recorder 31 is referred to as scope, then the scope is set in advance for each operation of the apparatus. Accordingly, the control circuit 54 requests the hard disk recorder 31 for image data of a scope corresponding to an operation mode.

Figure 5B:
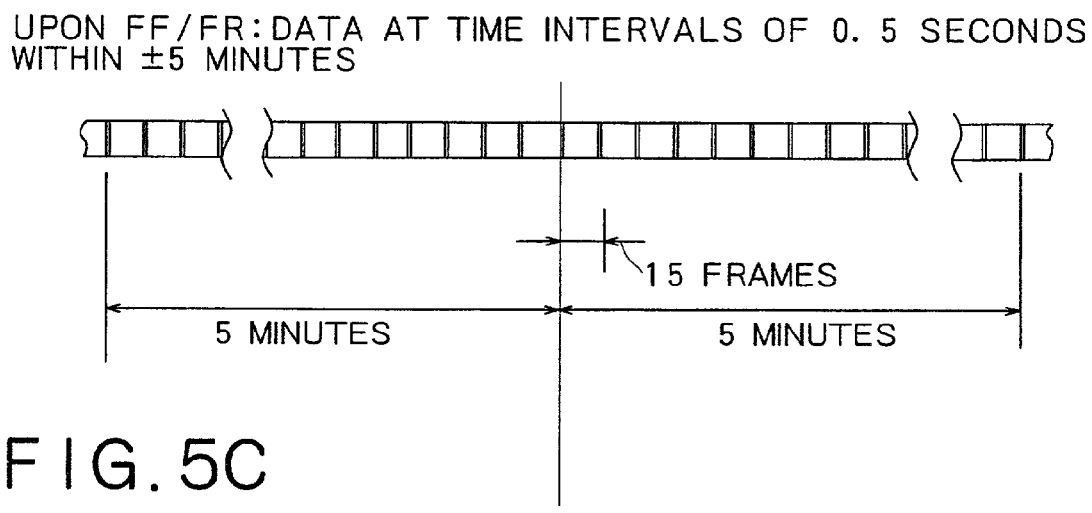
Figure 5C:
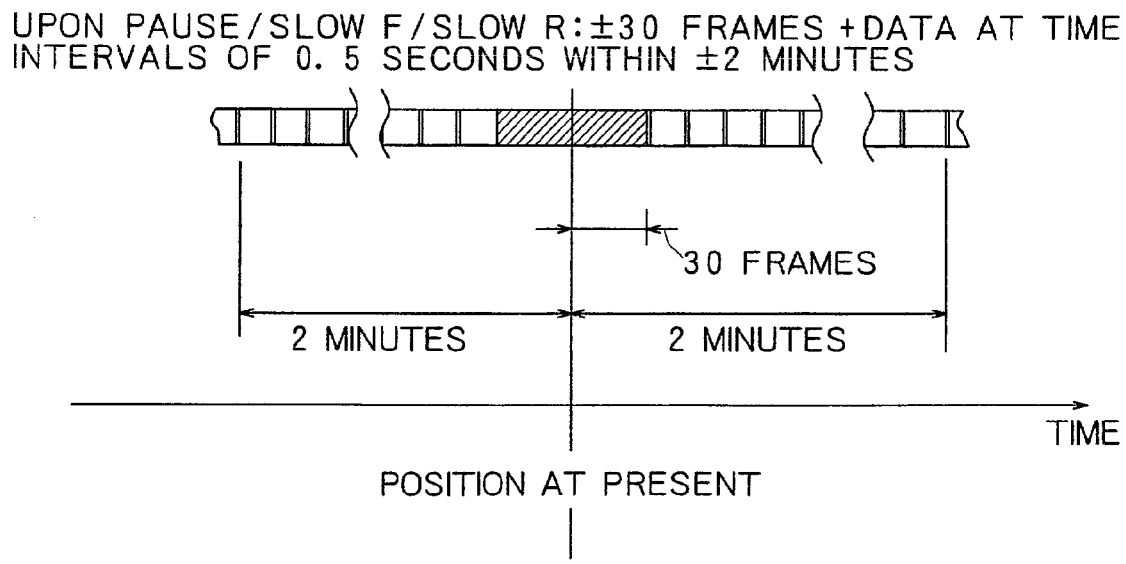

In particular, where the operation mode is a normal playback (playback at a normal speed) mode, the control circuit 54 issues a request for image data of successive 15 frames forwardly and backwardly adjacent the noticed frame and image data at positions of time intervals of 0.5 seconds within a range of 2 minutes forwardly and backwardly of the noticed frame as seen in FIG. 5A.

Where the operation mode is a fast feed mode, the control circuit 54 issues a request for image data of frames at positions of time intervals of 0.5 seconds within a range of 5 minutes forwardly and backwardly of the noticed frame as seen in FIG. 5B. It is to be noted that, if the user operates a button (rewind button) of the operation panel 55 for inputting a rewinding instruction, then the control circuit 54 sets the operation mode to a rewinding mode (mode in which reverse playback is performed at the N-fold speed), and also in this rewinding mode, the control circuit 54 issues a request for image data similar to that in the fast feed mode illustrated in FIG. 5B.

Where the operation mode is a pause mode, the control circuit 54 issues a request for image data of successive 30 frames forwardly and backwardly adjacent the noticed frame and image data at positions of time intervals of 0.5 seconds within a range of 2 minutes forwardly and backwardly of the notice frame as seen in FIG. 5C. It is to be noted that, if the user operates a button (slow playback button or slow reverse playback button) of the operation panel 55 for inputting a slow playback or slow reverse playback instruction, then the control circuit 54 sets the operation mode to a slow playback mode (mode in which playback is performed at the 1/N-fold speed) or a slow reverse playback mode (mode in which reverse playback is performed at the 1/N-fold speed), and also in the slow playback mode or the slow reverse playback mode, the control circuit 54 issues a request for image data similar to that in the pause mode illustrated in FIG. 5C.

It is to be noted that the control circuit 54 refers to the management information of the management memory 54A and issues a request only for those of image data of such a scope as described above which are not stored in the buffer 56.

Accordingly, although not only image data necessary, for example, for real-time playback but also unnecessary image data may be transmitted from the hard disk recorder 31 to the digital television monitor 32, since, in the present AV system, transmission of data from the hard disk recorder 31 to the digital television monitor 32 is performed at a transmission rate higher than the normal transmission rate as described hereinabove, the real-time playback is not disturbed at all by the transmission of image data which are not necessary for the real-time playback. In other words, since a bandwidth other than the bandwidth corresponding to the normal transmission rate necessary for the real-time playback is used for transmission of image data of the scope, the real-time playback is not disturbed by the transmission of image data of the scope at all.

Furthermore, since transmission of image data of the scope from the hard disk recorder 31 to the digital television monitor 32 is performed using the remaining transmission bandwidth of the transmission bandwidth (transmission rate) allocated to data transmission from the hard disk recorder 31 to the digital television monitor 32 other than the minimum transmission bandwidth necessary for transmission of image data for real-time playback as described hereinabove, all image data of the scope cannot always be transmitted from the hard disk recorder 31 to the digital television monitor 32. Therefore, image data of the scope have priority order numbers applied thereto, and the control circuit 54 issues a request for the image data of the scope in accordance with the priority order numbers.

The priority order numbers are set such that, for example, a nearer frame in time to the noticed frame has a higher degree of priority. Further, a frame preceding in time has a higher degree of priority than another frame following in time. In this instance, where a frame preceding to the noticed frame in time and another frame following the notice frame in time are spaced by an equal time interval from the noticed frame, the frame which precedes in time has a higher degree of priority than the frame which follows in time, and accordingly, the request for the frame which precedes in time is preferential to the request for the frame which follows in time. It is to be noted that, where the priority order numbers are set in this manner, the noticed frame has the highest degree of priority, and since the noticed frame is a frame to be played back now, it is transmitted using the bandwidth corresponding to the normal transmission rate.

Since the digital television monitor 32 issues a request for image data of the scope to the hard disk recorder 31 and stores the image data into the buffer 56 in such a manner as described above, the responsibility of the apparatus can be improved.

For example, if the operation mode of the digital television monitor 32 is the normal playback mode, then a request for image data of successive 15 frames forwardly and backwardly adjacent the noticed frame and image data at positions of time intervals of 0.5 seconds within a range of 2 minutes forwardly and backwardly of the noticed frame as seen in FIG. 5A is issued to the hard disk recorder 31, and such image data are stored into the buffer 56. Accordingly, if the user operates the operation panel 55 to perform a fast feed operation or a rewinding operation, then if the image data at the positions of time intervals of 0.5 seconds within the range of 2 minutes forwardly and backwardly of the noticed frame from within the image data of the scope illustrated in FIG. 5A are read out from the buffer 56 and supplied to the display unit 53, then an image of a fast feed or rewinding state is displayed immediately on the display unit 53. On the other hand, for example, in the normal playback mode, if the user operates the operation panel 55 to perform a slow playback operation or a slow reverse playback operation, then if the image data forwardly and backwardly adjacent the noticed frame from within the image data of the scope illustrated in FIG. 5A are read out from the buffer 56 and supplied to the display unit 53, then an image of a slow playback or slow reverse playback state is displayed immediately on the display unit 53.

It is to be noted that the manner of setting a scope for an operation mode and the manner of application of priority order numbers to image data of the scope are not limited to the specific ones described above.

Furthermore, where a request for image data of the scope is issued from the digital television monitor 32 to the hard disk recorder 31, if the request for image data of the scope is performed, for example, for each one frame, then the overhead by the signal for the request is greater than that where the request is performed collectively for a plurality of frames, and this deteriorates the transmission efficiency. Therefore, it is possible to issue a request for image data of the scope collectively for a plurality of frames (for example, 15 frames) from the digital television monitor 32 to the hard disk recorder 31. Further, if a higher transmission efficiency is achieved where a request also for image data at positions other than the scope is issued than where a request only for image data of the scope is issued, then a request for image data at such positions other than the scope as described above may be issued.

Figure 6:
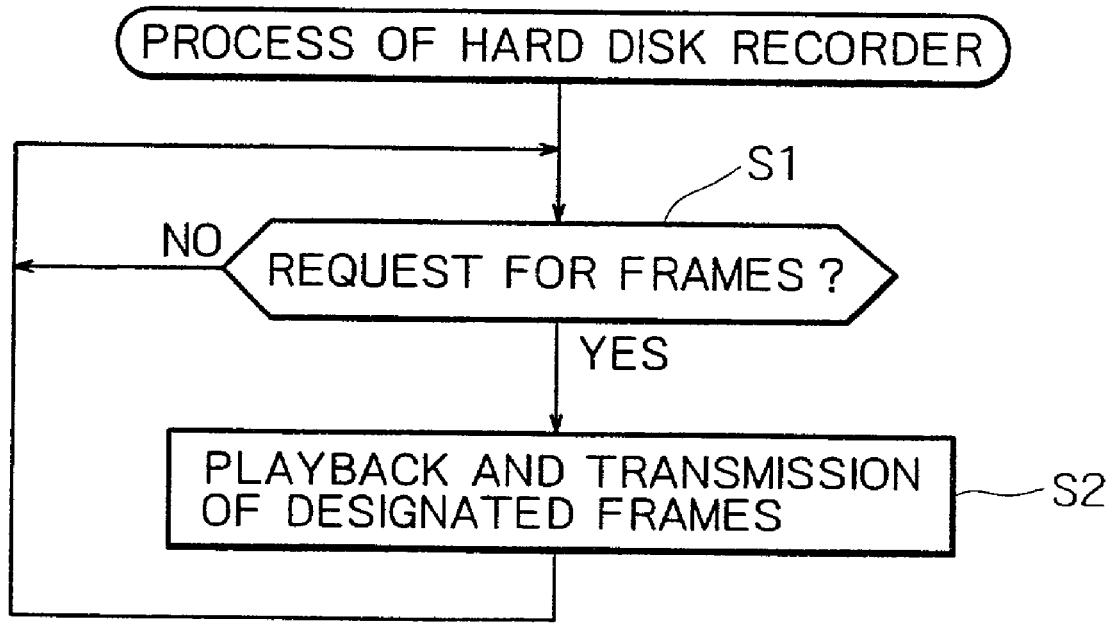
FIG. 6 is a flow chart illustrating a process of a hard disk recorder shown in FIG. 2.

Now, a process of the hard disk recorder 31 of FIG. 2 is described with reference to FIG. 6.

First in step S1, the control circuit 44 discriminates whether or not a request for image data is received from the digital television monitor 32. If it is discriminated in step S1 that a request for image data is not received, that is, if a request for image data from the digital television monitor 32 is not received by the interface circuit 43, then the processing returns to step S1 so that similar processing is repeated thereafter.

On the other hand, if it is discriminated in step S1 that a request for image data is received, that is, if a request for image data from the digital television monitor 32 is received by the interface circuit 43, then the processing advances to step S2, in which the control circuit 44 controls the signal processing circuit 42 and the interface circuit 43 to play back and transmit the image data designated by the request.

In particular, the signal processing circuit 42 plays back the image data of frames designated by the request from the digital television monitor 32 from the hard disk 41 and supplies the played back image data to the interface circuit 43. The interface circuit 43 transmits the image data from the signal processing circuit 42 to the digital television monitor 32 by the data channel of the IEEE 1394 cable 3. Thereafter, the processing returns to step S1 so that similar processing is repeated.

In this manner, only when a request is received from the digital television monitor 32, the hard disk recorder 31 transmits image data designated by the request to the digital television monitor 32 through the IEEE 1394 cable 3.

Now, a buffer process performed for the buffer 56 by the digital television monitor 32 of FIG. 2 is described with reference to FIG. 7.

In the buffer processing, first in step S11, the control circuit 54 discriminates whether or not the noticed frame, that is, the frame to be displayed at present on the display unit 53, has been changed in a playback control process which is hereinafter described. If it is discriminated in step S11 that the noticed frame has been changed, that is, if the frame to be displayed on the display unit 53 has been changed, then the processing advances to step S12, in which the control circuit 54 requests the hard disk recorder 31 for image data in accordance with the necessity.

In particular, if the noticed frame is changed, then also the scope changes as can be recognized from the description given hereinabove with reference to FIGS. 5A to 5C, and therefore, a request for image data of the scope after the change is issued to the hard disk recorder 31.

It is to be noted that, also when a frame of certain contents is displayed first on the display unit 53 such as when the power supply to the digital television monitor 32 is connected or when contents to be played back are changed, it is discriminated in step S11 that the noticed frame has been changed.

In step S12, the control circuit 54 recognizes the operation mode of the digital television monitor 32, and then advances the processing to step S13. In step S13, the control circuit 54 recognizes the scope (FIGS. 5A to 5C) set with regard to the operation mode recognized in step S12, and then advances the processing to step S14.

In particular, as described hereinabove with reference to FIGS. 5A to 5C, when the operation mode is the normal playback mode, the positions of successive 15 frames forwardly and backwardly adjacent the noticed frame and the positions of time intervals of 0.5 seconds within a range of 2 minutes forwardly and backwardly of the noticed frame are recognized as the scope (FIG. 5A). On the other hand, when the operation mode is the fast feed mode or the rewinding mode, the positions of time intervals of 0.5 seconds within a range of 5 minutes forwardly and backwardly of the noticed frame are recognized as the scope (FIG. 5B). Further, when the operation mode is a pause mode, a slow playback mode or a slow reverse playback mode, the positions of 30 frames forwardly and backwardly adjacent the noticed frame and the positions of time intervals of 0.5 seconds within a range of 2 minutes forwardly and backwardly of the notice frame are recognized as the scope (FIG. 5C).

In step S14, the control circuit 54 refers to the management information of the management memory 54A to recognize non-stored image data, which are image data of frames not stored in the buffer 56, from among the image data of the scope recognized in step S12.

Then, the processing advances to step S15, in which the control circuit 54 discriminates whether or not non-stored image data are present. If the control circuit 54 discriminates that non-stored image data are not present, then the processing advances to step S17 skipping step S16.

On the other hand, if it is discriminated in step S15 that non-stored image data are present, then the processing advances to step S16, in which the control circuit 54 controls the interface circuit 51 to issue a request for the non-recorded image data in accordance with the priority order numbers of frames of them to the hard disk recorder 31, whereafter the processing advances to step S17. Consequently, the interface circuit 51 transmits a signal for requesting for the non-stored image data to the hard disk recorder 31 through the control channel of the IEEE 1394 cable 3.

On the other hand, if it is discriminated in step S11 that the noticed frame has not been changed, that is, if the frame to be displayed on the display unit 53 has not been changed, then the processing advances to step S17, in which the control circuit 54 discriminates whether or not the image data for which the request has been issued in step S16 are received from the hard disk recorder 31. If it is discriminated in step S17 that the image data for which the request has been issued in step S16 are not received, then the processing returns to step S11 so that similar processing is repeated thereafter.

On the other hand, if it is discriminated in step S17 that the image data for which the request has been issued in step S16 are received, that is, if the image data of the object of the request are received by the interface circuit 51, then the processing advances to step S18, in which the control circuit 54 controls the interface circuit 51 and the signal processing circuit 52 to store the image data into the buffer 56.

Consequently, the interface circuit 51 supplies the image data received from the hard disk recorder 31 to the signal processing circuit 52, and the signal processing circuit 52 in turn supplies and stores the image data to and into the buffer 56.

Thereafter, in step S19, the control circuit 54 updates that of the management information stored in the management memory 54A which corresponds to the frames of the image data having been stored into the buffer 56 in step S18. Then, the processing returns to step S11 so that similar processing is repeated thereafter.

According to the buffer process described above, immediately after playback of image data is started, no image data are stored in the buffer 56, and accordingly, image data are transmitted from the hard disk recorder 31 to the digital television monitor 32 through the IEEE 1394 cable 3. However, as the playback is continued, image data are stored into the buffer 56, and for example, all image data of certain contents are stored finally into the buffer 56. As a result, if it is intended to play back the image contents again, then only it is required to read out the image data from the buffer 56, but it is not necessary to have image data of the same image contents transmitted from the hard disk recorder 31 again. Accordingly, the transmission efficiency can be improved.

Figure 8:
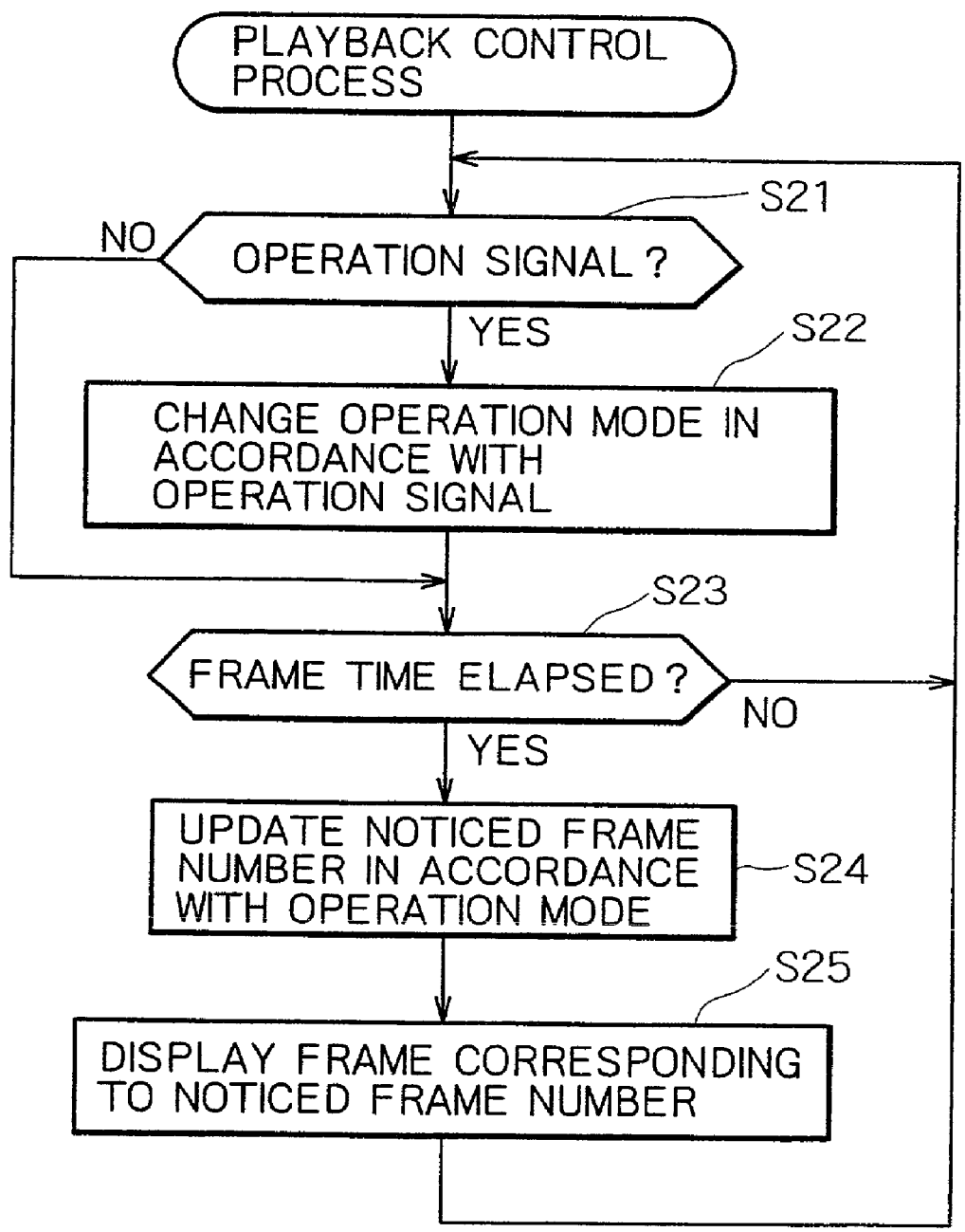
FIG. 8 is a flow chart illustrating a playback control process by the digital television monitor shown in FIG. 2.

Now, a playback control process performed by the digital television monitor 32 of FIG. 2 is described with reference to FIG. 8.

In the playback control process, the operation mode of the digital television monitor 32 is changed in response to an operation of the operation panel 55 by the user, and playback of image data is performed in accordance with the operation mode.

In particular, in the playback control process, the control circuit 54 discriminates first in step S21 whether or not an operation signal is received from the operation panel 55. If the control circuit 54 discriminates that an operation signal is not received, that is, if the user does not operate the operation panel 55, then the processing advances to step S23 skipping step S22.

On the other hand, if it is discriminated in step S21 that an operation signal from the operation panel 55 is received, that is, if the user operates the operation panel 55, then the processing advances to step S22, in which the control circuit 54 changes the operation mode of the digital television monitor 32 to a mode corresponding to the operation signal from the operation panel 55.

Then, the processing advances to step S23, in which the control circuit 54 discriminates whether or not an interval of time corresponding to one frame elapses after the frame number of the noticed frame (which may be hereinafter referred to suitably as noticed frame number) was updated last. If the control circuit 54 discriminates that the interval of time does not elapse, then the processing returns to step S21 so that similar processing is repeated thereafter.

On the other hand, if it is discriminated in step S23 that the interval of time corresponding to one frame elapses after the noticed frame number was updated last, then the processing advances to step S24, in which the control circuit 54 updates the noticed frame number in accordance with the operation mode. In particular, if the operation mode is the normal playback mode, then the control circuit 54 increments the noticed frame number by one every time it is discriminated in step S23 that the interval of time corresponding to one frame elapses. In this instance, since the noticed frame number increase by one every time the interval of time corresponding to one frame elapses, the noticed frame corresponding to the noticed frame number provides a normally played back image.

On the other hand, when the operation mode is the fast feed mode or the rewinding mode, the control circuit 54 increments or decrements the noticed frame number by N every time it is discriminated in step S23 that the interval of time corresponding to one frame elapses. In this instance, since the noticed frame number increases or decreases by N every time the interval of time corresponding to one frame elapses, the noticed frame corresponding to the noticed frame number provides an image played back or reversely played back at the N-fold speed.

Furthermore, when the operation mode is the pause mode, the control circuit 54 does not change the noticed frame number. In this instance, since the noticed frame does not change either, the noticed frame corresponding to the noticed frame number does not change but provides the same image and exhibits a pause state.

On the other hand, when the operation mode is the slow playback mode or the slow reverse playback mode, the control circuit 54 increments or decrements the noticed frame number by one every time it is discriminated by N times in step S23 that the interval of time corresponding to one frame elapses. In this instance, since the noticed frame number increases or decreases by one every time the interval of time corresponding to N frames elapses, the noticed frame corresponding to the noticed frame number provides an image played back or reversely played back at the 1/N-fold speed.

After the noticed frame number is updated in such a manner as described above in step S24, the processing advances to step S25, in which the control circuit 54 issues an instruction to the signal processing circuit 52 to display a frame corresponding to the noticed frame number. In this instance, the signal processing circuit 52 reads out image data of the frame corresponding to the noticed frame number from the buffer 56, decodes the image data if necessary and supplies the image data to the display unit 53 so that the image data are displayed on the display unit 53. Thereafter, the processing returns to step S21 so that similar processing is executed thereafter.

According to such a playback control process as described above, image data having been stored into the buffer 56 by the buffer process described hereinabove are read out and displayed on the display unit 53. Accordingly, for example, in the pause mode (similarly in the slow playback mode and the slow reverse playback mode), image data of the same frame are not transmitted repetitively from the hard disk recorder 31 to the digital television monitor 32 as in the prior art. Consequently, the transmission bandwidth can be utilized efficiently, and besides use of the transmission bandwidth by another application is not limited at all.

Figure 9:
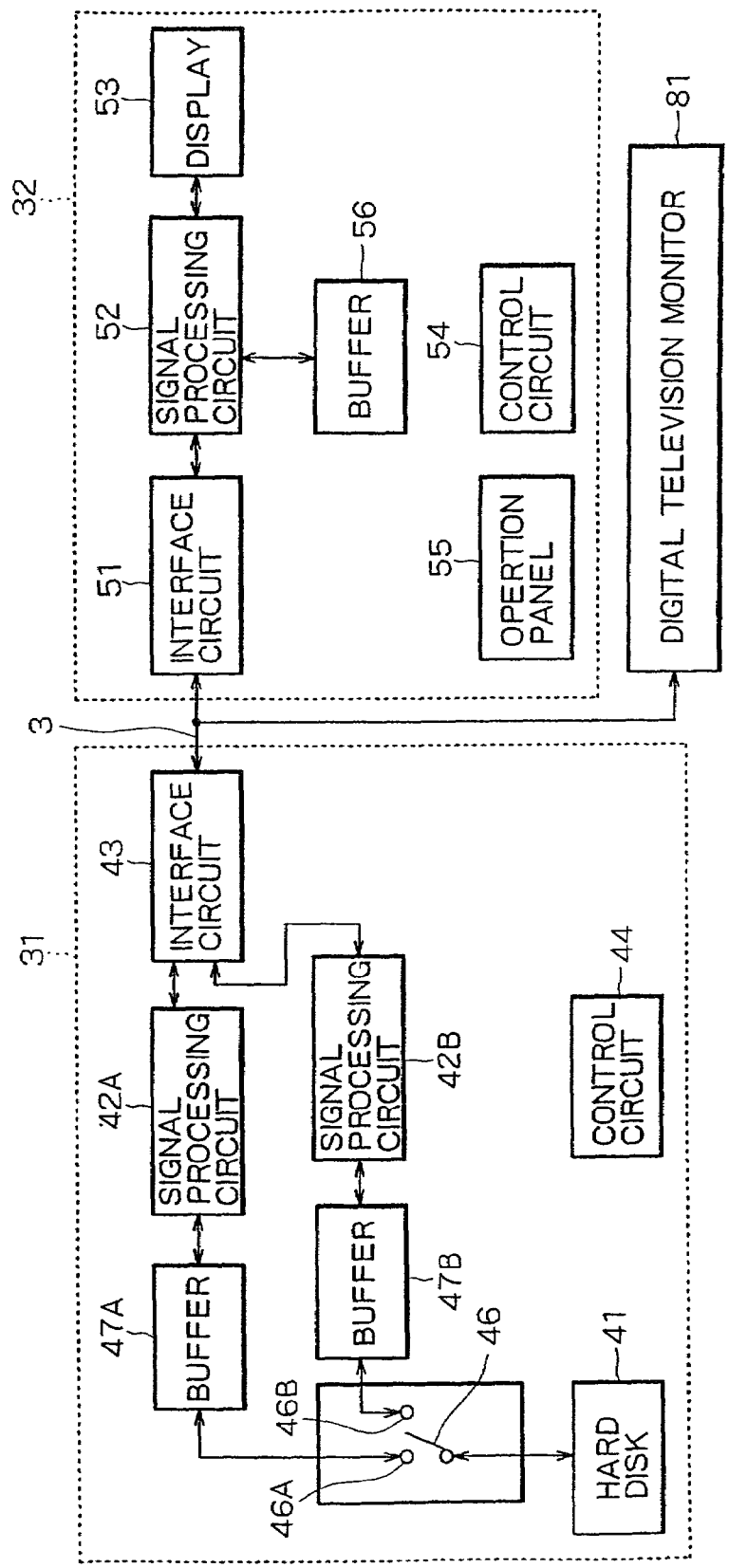
FIG. 9 is a block diagram showing an example of configuration of another AV system to which the present invention is applied.

FIG. 9 shows an example of configuration of another AV system to which the present invention is applied. It is to be noted that, in FIG. 9, like elements to those of FIG. 2 are denoted by like reference numerals, and overlapping description of them is omitted suitably herein to avoid redundancy.

The AV system of FIG. 9 includes, in addition to the digital television monitor 32, a digital television monitor 81 as a digital television monitor which receives and displays image data from the hard disk recorder 31.

The digital television monitor 81 has a configuration similar to that of the digital television monitor 32. However, transmission operations of image data from the hard disk recorder 31 to the digital television monitors 32 and 81 are performed independently of each other in response to requests from the digital television monitors 32 and 81. Accordingly, image data transmitted from the hard disk recorder 31 to the digital television monitor 81 and image data transmitted from the hard disk recorder 31 to the digital television monitor 32 need not necessarily be the same.

In order to transmit image data to the two digital television monitors 32 and 81 independently of each other, the hard disk recorder 31 includes not the single signal processing circuit 42 but a pair of signal processing circuits 42A and 42B. The hard disk recorder 31 additionally includes a switch 46 and a pair of buffers 47A and 47B.

The switch 46 selects one of a pair of terminals 46A and 46B thereof under the control of the control circuit 44. The terminal 46A is connected to the buffer 47A while the terminal 46B is connected to the buffer 47B. Accordingly, accessing to the hard disk 41 is performed from the signal processing circuit 42A through the buffer 47A and the switch 46 or from the signal processing circuit 42B through the buffer 47B and the switch 46.

In particular, in order to record image data onto the hard disk 41, the image data of the object of recording are supplied from the signal processing circuit 42A to the buffer 47A or supplied from the signal processing circuit 42B to the buffer 47B. Then, the buffer 47A temporarily stores the image data from the signal processing circuit 42A, and the buffer 47B temporarily stores the image data from the signal processing circuit 42B.

The switch 46 time-divisionally selects the terminals 46A and 46B alternately under the control of the control circuit 44. When the switch 46 selects the terminal 46A, the image data stored in the buffer 47A are read out through the switch 46 and supplied to and recorded onto the hard disk 41. On the other hand, when the switch 46 selects the terminal 46B, the image data stored in the buffer 47B are read out through the switch 46 and supplied to and recorded onto the hard disk 41.

On the other hand, when image data are read out from the hard disk 41, if the switch 46 selects the terminal 46A, then the image data read out from the hard disk 41 are supplied through the switch 46 to and temporarily stored into the buffer 47A. However, if the switch 46 selects the terminal 46B, then the image data read out from the hard disk 41 are supplied through the switch 46 to and temporarily stored into the buffer 47B. The image stored in the buffer 47A are supplied through the signal processing circuit 42A to the interface circuit 43 and further supplied, for example, to the digital television monitor 32 through the IEEE 1394 cable 3. On the other hand, the image data stored in the buffer 47B are supplied through the signal processing circuit 42B to the interface circuit 43 and further supplied, for example, to the digital television monitor 81 through the IEEE 1394 cable 3.

In this manner, image data can be transmitted from the hard disk recorder 31 to the digital television monitors 32 and 81 in accordance with requests from the digital television monitors 32 and 81 so that real-time playback may be individually be performed in time by the digital television monitors 32 and 81, respectively.

It is to be noted that the hard disk 41 in the AV system of FIG. 9 operates at a transfer rate sufficient to read out image data for 2 channels to be transmitted to the digital television monitors 32 and 81. Accordingly, the readout rate of image data from the hard disk 41 here is at least equal to the sum of the transmission rate of image data to the digital television monitor 32 and the transmission rate of image data to the digital television monitor 81.

Further, if it is assumed that, for example, the signal processing circuit 42A and the buffer 47A are referred to as A channel system and the signal processing circuit 42B and the buffer 47B are referred to as B channel system and transmission of image data to the digital television monitor 32 is performed by the A channel system while transmission of image data to the digital television monitor 81 is performed by the B channel system, then the processes for the A channel system and the B channel system are performed independently of each other by the hard disk recorder 31.

In particular, in the present AV system, the hard disk recorder 31 has two modes of a playback mode and a steady mode and changes over the operation mode thereof between the two modes in accordance with a mode signal received. However, this transition of the operation mode is performed for only one of the A channel system and the B channel system which corresponds to one of the digital television monitors which has transmitted the mode signal. More particularly, if the digital television monitor 32 has transmitted the mode signal, then the A channel system which takes charge of the digital television monitor 32 is placed into the operation mode. However, if the digital television monitor 81 has transmitted the mode signal, then the B channel system which takes charge of the digital television monitor 81 is placed into the operation mode.

Figure 10:
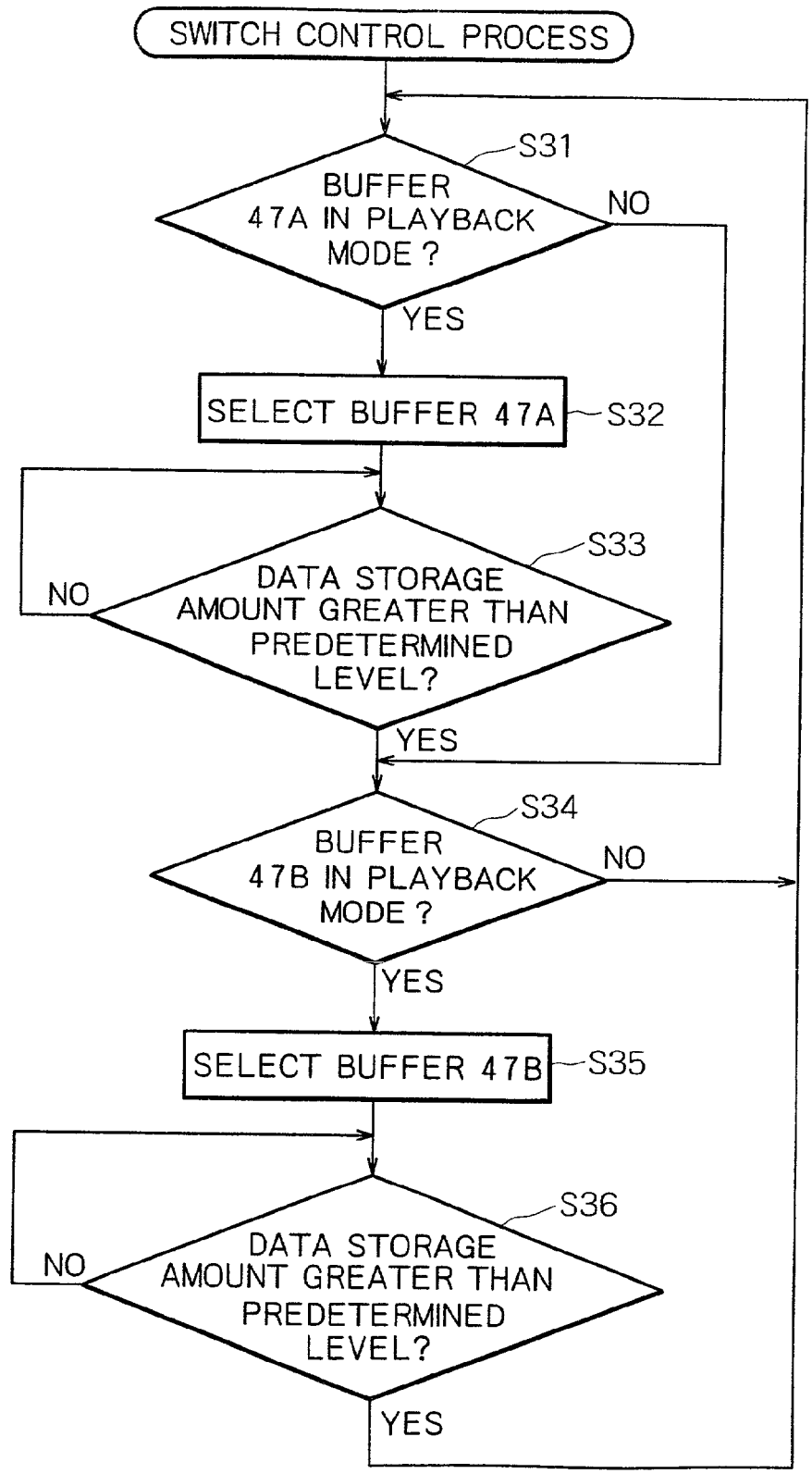
FIG. 10 is a flow chart illustrating a switch control process by a hard disk recorder shown in FIG. 9.

Now, a control process of the switch 46 by the control circuit 44 of the hard disk recorder 31 when image data are read out from the hard disk 41 of FIG. 9 is described with reference to FIG. 10.

First in step S31, the control circuit 44 discriminates whether or not the A channel system is in the playback mode. If the control circuit 44 discriminates that the A channel system is not in the playback mode, that is, if the A channel system is in the steady mode, then the processing advances to step S34 skipping steps S32 and S33.

On the other hand, if it is discriminated in step S31 that the A channel system is in the playback mode, then the processing advances to step S32, in which the control circuit 44 controls the switch 46 to select the terminal 46A connected to the buffer 47A. Then, the processing advances to step S33, in which the control circuit 44 discriminates whether or not the data storage amount of the buffer 47A is greater than a predetermined threshold value. If it is discriminated in step S33 that the data storage amount of the buffer 47A is not greater than the predetermined threshold value, that is, if the data storage amount of the buffer 47A is such that, for example, if supply of image data from the hard disk 41 to the buffer 47A is temporarily stopped, then image data stored in the buffer 47A are all transmitted to the digital television monitor 32 before supply of image data from the hard disk 41 to the buffer 47A is started subsequently and consequently transmission of image data to the digital television monitor 32 may possibly be interrupted, then the processing returns to step S33.

Accordingly, in this stance, even if supply of image data from the hard disk 41 to the buffer 47A temporarily stops, the processing in step S33 is repeated until after image data of an amount with which the transmission of image data to the digital television monitor 32 is not interrupted before supply of image data from the hard disk 41 to the buffer 47A is started subsequently, and within this period, image data read out from the hard disk 41 are supplied through the switch 46 to and stored into the buffer 47A.

On the other hand, if it is discriminated in step S33 that the data storage amount of the buffer 47A is greater than the predetermined threshold value, that is, if the data storage amount of the buffer 47A is such that, even if supply of image data from the hard disk 41 to the buffer 47A is temporarily stopped, transmission of image data to the digital television monitor 32 is not interrupted before supply of image data from the hard disk 41 to the buffer 47A is started subsequently, then the processing returns to step S34.

In step S34, the control circuit 44 discriminates whether or not the B channel system is in the playback mode. If the control circuit 44 discriminates that the B channel system is not in the playback mode, then the processing returns to step S31 skipping steps S35 and S36.

On the other hand, if it is discriminated in step S34 that the B channel system is in the playback mode, then the processing advances to step S35, in which the control circuit 44 controls the switch 46 to select the terminal 46B connected to the buffer 47B. Then, the processing advances to step S36, in which the control circuit 44 discriminates whether or not the data storage amount of the buffer 47B is greater than a predetermined threshold value. If it is discriminated that the data storage amount of the buffer 47B is not greater than a predetermined threshold value, that is, if the data storage amount of the buffer 47B is such that, for example, if supply of image data from the hard disk 41 to the buffer 47B is temporarily stopped, then image data stored in the buffer 47B are all transmitted to the digital television monitor 81 before supply of image data from the hard disk 41 to the buffer 47B is started subsequently and consequently transmission of image data to the digital television monitor 81 is interrupted, then the processing returns to step S36.

Accordingly, also in this stance, similarly as in step S33 described hereinabove, even if supply of image data from the hard disk 41 to the buffer 47B temporarily stops, the processing in step S36 is repeated until after image data of an amount with which the transmission of image data to the digital television monitor 81 is not interrupted before supply of image data from the hard disk 41 to the buffer 47B is started subsequently are stored into the buffer 47B, and within this period, image data read out from the hard disk 41 are supplied through the switch 46 to and stored into the buffer 47B.

On the other hand, if it is discriminated in step S36 that the data storage amount of the buffer 47B is greater than the predetermined threshold value, that is, if the data storage amount of the buffer 47B is such that, even if supply of image data from the hard disk 41 to the buffer 47B is temporarily stopped, transmission of image data to the digital television monitor 81 is not interrupted before supply of image data from the hard disk 41 to the buffer 47B is started subsequently, then the processing returns to step S31.

Here, if the hard disk 41 tries to transfer image data to the buffer 47A or 47B, then the data storage amount of the buffer 47A or 47B may possibly be an upper limit value to it. In such an instance, transfer of image data from the hard disk 41 to the buffer 47A or 47B is performed after it is waited that a free area appears in the buffer 47A or 47B. It is to be noted that such transfer control as just described may be performed by the control circuit 44 or alternatively a control line may be provided between the hard disk 41 and each of the buffers 47A and 47B such that the transfer control may be performed between the hard disk 41 and the buffer 47A or 47B.

According to such a switch control process as just described, when both of the A channel system and the B channel system are in the playback mode, theoretically the switch 46 time-divisionally selects the terminals 46A and 46B alternately. Then, if only one of the A channel system and the B channel system, for example, only the A channel system, is placed into the steady mode, then the switch 46 stops selection of the terminal 46A connected to the buffer 47A but selects only the terminal 46B. Then, if also the B channel system as the other of the A channel system and the B channel system is placed into the steady mode, then the switch 46 stops also selection of the terminal 46B. Consequently, also readout of image data from the hard disk 41 is stopped.

Thereafter, if only the A channel system as one of the A channel system and the B channel system is placed into the playback mode, then the switch 46 now selects only the terminal 46A connected to the buffer 47A, and readout of image data from the hard disk 41 is started in accordance with the necessity. Further, if also the B channel system as the other of the A channel system and the B channel system is placed into the playback mode, then the switch 46 time-divisionally selects the terminals 46A and 46B alternately.

Figure 7:
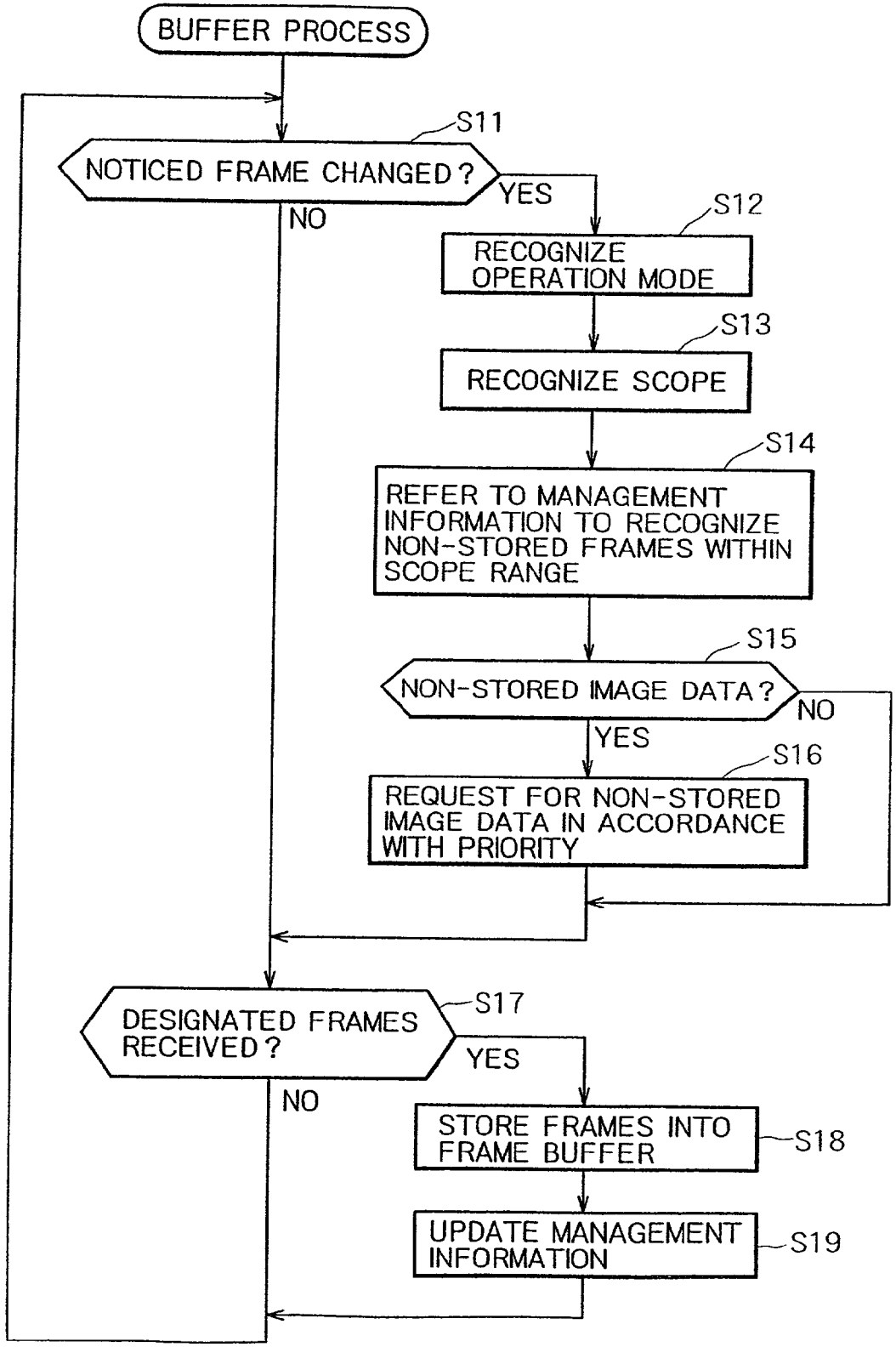
FIG. 7 is a flow chart illustrating a buffer process by a digital television monitor shown in FIG. 2.

It is to be noted that, in the hard disk recorder 31 of FIG. 9, image data of the object of the request issued by the processing of step S15 of FIG. 7 performed by the digital television monitor 32 or 81 are read out from the hard disk 41.

While the series of processes described above can be executed by hardware for exclusive use, it may otherwise be executed by software. Where the series of processes is executed by software, a program which constructs the software is installed into a computer for universal use or the like.

Figure 11:
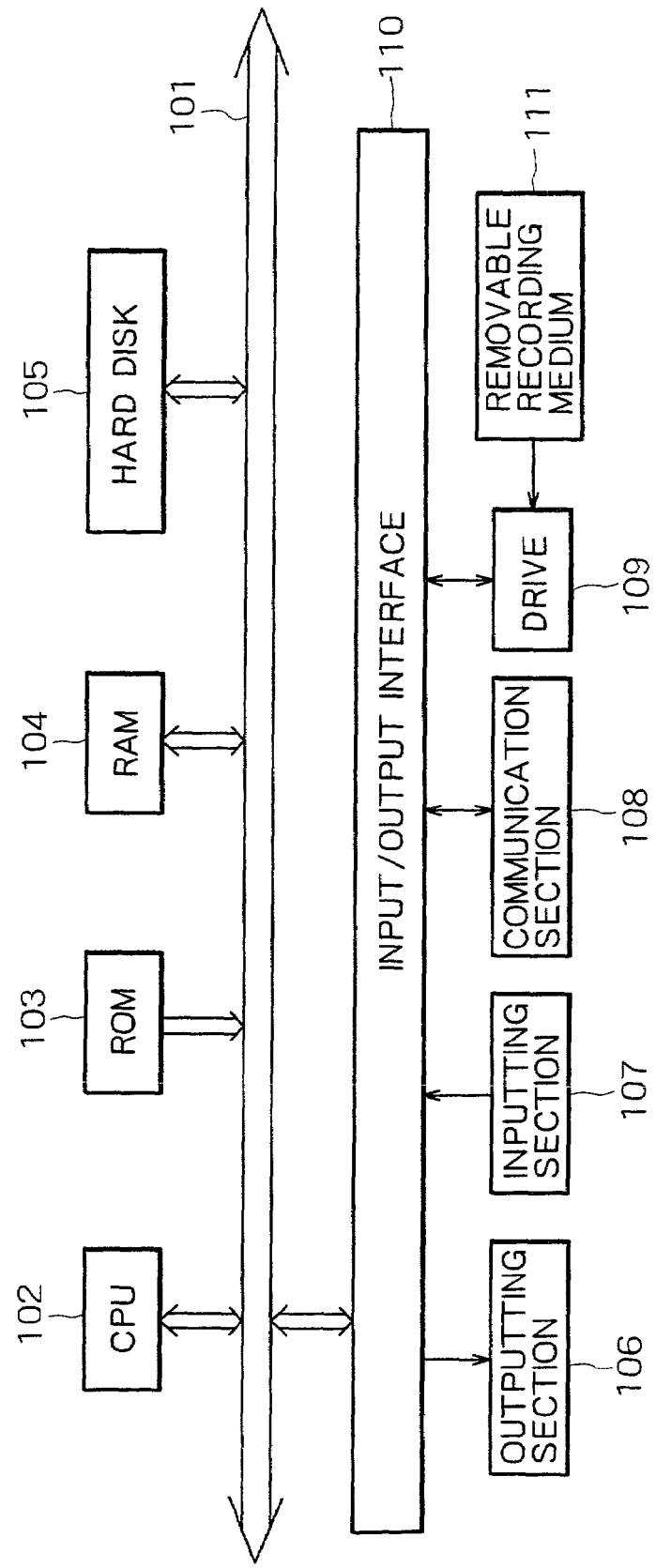
FIG. 11 is a block diagram showing an example of configuration of a computer to which the present invention is applied.

FIG. 11 shows an example of configuration of a computer into which a program for execution of the series of processes described hereinabove is installed.

The program can be recorded in advance on a hard disk 105 or in a ROM 103 as a recording medium built in the computer.

Alternatively, the program may be stored (recorded) temporarily or permanently on a removable recording medium 111 such as a floppy disc, a CD-ROM (Compact Disc Read Only Memory), an MO (Magneto-optical) disk, a DVD (Digital Versatile Disc), a magnetic disk or a semiconductor memory. The removable recording medium 111 of the type mentioned can be provided as package software.

It is to be noted that the program not only can be installed from such a removable recording medium 111 as described above into the computer, but also can be transferred by radio from a download site to the computer through an artificial satellite for digital satellite broadcasting or by wire to the computer through a network such as the Internet such that the computer may receive the program transferred in this manner by means of a communication section 108 and install the program into the hard disk 105 built therein.

The computer has a CPU (Central Processing Unit) 102 built therein. An input/output interface 110 is connected to the CPU 102 through a bus 101. If the user operates an inputting section 107 formed from a keyboard, a mouse, a microphone and so forth to issue an instruction, then the instruction is inputted to the CPU 102 through the input/output interface 110, and the CPU 102 executes a program stored in the ROM (Read Only Memory) 103 in accordance with the instruction. Or, the CPU 102 loads a program stored on the hard disk 105, a program transferred from a satellite or a network, received by the communication section 108 and installed on the hard disk 105 or a program read out from the removable recording medium 111 loaded in a drive 109 and installed in the hard disk 105 into a RAM (Random Access Memory) 104 and executes the thus loaded program. Consequently, the CPU 102 executes the processing described hereinabove with reference to the flow charts or processing available with the configurations described hereinabove with reference to the block diagrams. Then, when necessary, the CPU 102 causes a result of such processing to be, for example, outputted from an outputting section 106 formed from an LCD (Liquid Crystal Display) unit, a speaker and so forth, transmitted from the communication section 108 or recorded onto the hard disk 105 through the input/output interface 110.

It is to be noted that, in the present specification, the steps which describe a program recorded in or on a recording medium need not necessarily be processed in a time series in the order as described in the flow charts, and include processes which are executed parallelly or individually (for example, parallel processing or processing by an object).

Further, the program may be processed by a single computer or may otherwise be processed discretely by a plurality of computers. Furthermore, the program may be transferred to and executed by a computer at a remote place.

It is to be noted that the present invention can be applied also to IEEE 1394 apparatus in addition to a hard disk recorder and a digital television monitor. More particularly, the present invention can be applied, for example, to such a computer as shown in FIG. 11 which is equipped with an IEEE 1394 interface. Further, the present invention can be applied to apparatus which transmit or receive image data in accordance with a communication system other than the IEEE 1394 communication or through the Internet.

Further, while the AV systems described above adopt image data of the DV system, the present invention can be applied also to image data compression-coded, for example, in accordance with the MPEG (Moving Picture Experts Group) or the like or image data which are not in such a compression-coded state.

Furthermore, in the AV system of FIG. 9 described above, transmission/reception of image data of the pull type is performed wherein, when the operation panel 55 of the digital television monitor 32 of the reception side which receives image data is operated by the user, a request for transmission of image data or the like is issued to the hard disk recorder 31 of the transmission side which transmits image data, and in response to the request, image data are transmitted. However, the present invention can be applied also to another AV system which performs transmission/reception of image data of the push type wherein, when, for example, an operation panel, which is provided on the hard disk recorder 31 of the transmission side, is operated by the user, image data are automatically transmitted from the hard disk recorder 31 to the digital television monitor 32 of the reception side.

While preferred embodiments of the present invention have been described using specific terms, such description is for illustrative purposes only, and it is to be understood that changes and variations may be made without departing from the spirit or scope of the following claims.

What is claimed is:

1. An image processing apparatus, comprising:
   a reception section for receiving image data transmitted thereto from a transmission apparatus through a predetermined transmission line;
   a storage section having a storage capacity for a plurality of screens or more for storing the image data received by said reception section; and
   a control section for issuing a request for image data of screens within a predetermined range forward and backward with reference to a noticed screen to said transmission apparatus, controlling an operation mode to be one of a normal speed mode, a high speed mode higher than the normal speed mode, or a pause mode, and controlling a display apparatus to display the image data stored in said storage section, the predetermined range being set based on whether the operation mode is the normal speed mode, the high speed mode, or the pause mode, wherein the predetermined range is a first number of screens and image data at intervals within a first time period when the operation mode is the normal speed mode, the predetermined range is a second number of screens and image data at intervals of a second time period greater than the first time period when the operation mode is the high speed mode, and the predetermined range is a third number of screens, greater than the first and second number of screens, and image data at intervals of a third time period when the operation mode is the pause mode.

2. An image processing apparatus according to claim 1, wherein said transmission line transmits the image data at a transfer rate higher than the lowest transfer rate necessary to play back the image data normally.

3. An image processing apparatus according to claim 1, wherein said control section requests said transmission apparatus for those of the image data of the screens within the predetermined range which are not stored in said storage section.

4. An image processing apparatus according to claim 3, further comprising a management information storage section for storing, for each screen, management information of whether or not the image data of the screen are stored in said storage section, and wherein said control section recognizes, based on the management information, those of the image data of the screens within the predetermined range which are not stored in said storage section.

5. An image processing apparatus according to claim 1, wherein said control section requests said transmission apparatus for the image data of the screens within the predetermined range in accordance with a predetermined priority order.

6. An image processing apparatus according to claim 5, further comprising an inputting section for inputting an instruction of a playback method of the image data, and wherein said control section sets the predetermined range in accordance with the playback method of the image data.

7. An image processing apparatus according to claim 1, wherein said control section requests said transmission apparatus for image data of a predetermined plurality of screens within the predetermined range.

8. An image processing apparatus according to claim 7, further comprising an inputting section for inputting an instruction of a playback method of the image data, and wherein said control section sets a predetermined plurality of screens within the predetermined range in accordance with the playback method of the image data.

9. An image processing apparatus according to claim 1, wherein said transmission line complies with the IEEE 1394 standard.

10. An image processing apparatus according to claim 1, wherein the predetermined range is 2 minutes forward and backward of the noticed screen.

11. An image processing method, comprising:
    a reception step of receiving image data transmitted thereto from a transmission apparatus through a predetermined transmission line;
    a controlling step of controlling an operation mode to be one of a normal speed mode, a high speed mode higher than the normal speed mode, or a pause mode;
    a request step of requesting said transmission apparatus for image data of screens within a predetermined range forward and backward with reference to a noticed screen, the predetermined range being set based on whether the operation mode is the normal speed mode, the high speed mode, or the pause mode, wherein the predetermined range is a first number of screens and image data at intervals within a first time period when the operation mode is the normal speed mode, the predetermined range is a second number of screens and image data at intervals of a second time period greater than the first time period when the operation mode is the high speed mode, and the predetermined range is a third number of screens, greater than the first and second number of screens, and image data at intervals of a third time period when the operation mode is the pause mode;
    an image storage step of storing the image data of the screens within the predetermined range received by the reception step; and
    a display control step of controlling a display apparatus to display the stored image data.

12. An image processing apparatus according to claim 11, wherein the predetermined range is 2 minutes forward and backward of the noticed screen.

13. A recording medium on which a program to be executed by a computer is recorded, the program comprising:
- a reception step of receiving image data transmitted thereto from a transmission apparatus through a predetermined transmission line;
- a controlling a step of controlling an operation mode to be one of a normal speed mode, a high speed mode higher than the normal speed mode, or a pause mode;
- a request step of requesting said transmission apparatus for image data of screens within a predetermined range forward and backward with reference to a noticed screen, the predetermined range being set based on whether the operation mode is the normal speed mode, the high speed mode, or the pause mode, wherein the predetermined range is a first number of screens and image data at intervals within a first time period when the operation mode is the normal speed mode, the predetermined range is a second number of screens and image data at intervals of a second time period greater than the first time period when the operation mode is the high speed mode, and the predetermined range is a third number of screens, greater than the first and second number of screens, and image data at intervals of a third time period when the operation mode is the pause mode;
- an image storage step of storing the image data of the screens within the predetermined range received by the reception step; and
- a display control step of controlling a display apparatus to display the image data stored in said storage section.

14. An image processing apparatus according to claim 13, wherein the predetermined range is 2 minutes forward and backward of the noticed screen.

15. An image processing apparatus, comprising:
- a transmission apparatus for playing back image data and transmitting the image data through a predetermined transmission line; and
- a reception apparatus for receiving the image data transmitted thereto from said transmission apparatus through said transmission line;
- said transmission apparatus including a playback section for playing back image data in response to a request from said reception apparatus and a transmission section for transmitting the played back image data to said reception apparatus through said predetermined transmission line;
- said reception apparatus including a reception section for receiving the image data transmitted thereto from said transmission apparatus through said predetermined transmission line, a storage section having a storage capacity for a plurality of screens or more for storing the image data received by said reception section, and a display control section for issuing a request for image data of screens within a predetermined range forward and backward with reference to a noticed screen to said transmission apparatus, for controlling an operation mode to be one of a normal speed mode, a high speed mode higher than the normal speed mode, or a pause mode, and for controlling a display apparatus to display the image data stored in said storage section, the predetermined range being set based on whether the operation mode is the normal speed mode, the high speed mode, or the pause mode, wherein the predetermined range is a first number of screens and image data at intervals within a first time period when the operation mode is the normal speed mode, the predetermined range is a second number of screens and image data at intervals of a second time period greater than the first time period when the operation mode is the high speed mode, and the predetermined range is a third number of screens, greater than the first and second number of screens, and image data at intervals of a third time period when the operation mode is the pause mode.

16. An image processing apparatus according to claim 15, wherein the predetermined range is 2 minutes forward and backward of the noticed screen.

* * * * *